(No Model.)
J. J. SCHILLINGER.
WATERPROOFING CELLARS, &c.
No. 299,425. Patented May 27, 1884.
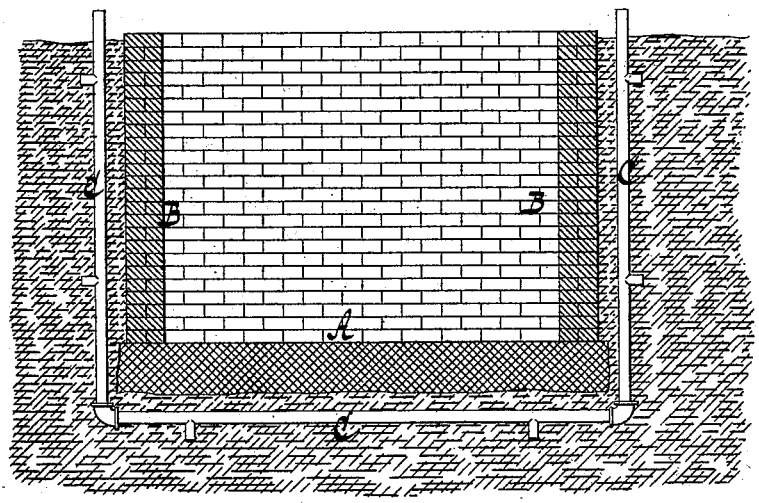
WITNESSES:
Otto Hufeland
William Miller
INVENTOR
John J. Schillinger
BY Van Santvoord & Hauff
ATTORNEYS

UNITED STATES PATENT OFFICE.

JOHN J. SCHILLINGER, OF NEW YORK, N. Y.

WATERPROOFING CELLARS, &c.

SPECIFICATION forming part of Letters Patent No. 299,425, dated May 27, 1884.

Application filed April 24, 1884. (No model.)

*To all whom it may concern:*

Be it known that I, JOHN J. SCHILLINGER, a citizen of the United States, residing at New York, in the county and State of New York, have invented new and useful Improvements in Waterproofing Cellars, &c., of which the following is a specification.

This invention relates to a process of waterproofing cellars and other subterranean structures, said process consisting in providing said structures with a suitable floor and walls, and then charging the earth or other material beneath the floor and outside of the walls with bitumen or equivalent material.

The accompanying drawing represents a transverse vertical section of a subterranean structure treated according to my invention. In this drawing, the letter A designates the floor of the subterranean structure, and B B are the walls. The floor and the walls may be made of hydraulic cement, or of brick, or of any other material suitable for the purpose. If a structure of this kind is exposed to a pressure of water from the outside, the water after a time forces itself through crevices and cracks in the floor and walls, and the interior of the structure becomes damp and filled with water. Many attempts have been made to overcome this difficulty, and I myself have for many years past attempted to waterproof the floor and the walls of subterranean structures—for instance, by applying a coat of tar to the outer surfaces of the walls or floor, or by placing one or more layers of tar-paper into the bodies of the walls or of the floor; but all my attempts have failed to produce the desired result. My present invention, however, relates to a process for waterproofing the floor and the walls of subterranean structures, whereby an entirely satisfactory result is obtained. In carrying out this process I proceed as follows: After the floor and the walls have been finished in the ordinary manner, I bore one or more holes through the floor, and, if requisite, also through the walls, and through these holes I force a quantity of liquid bitumen until the material beneath the floor and behind the walls is thoroughly saturated, and all the interstices existing in said material are filled with the bitumen. When this operation has been completed, the holes in the floor and walls are stopped up. Instead of making holes in the floor and walls for the purpose of injecting the liquid bitumen, I can accomplish this object by means of pipes C extending down on the sides of the walls and beneath the floor, said pipes being put in position before the floor and the walls are completed. In place of bitumen, other materials may be employed, such as fish-oil, stearine, tallow, or similar fatty substances which are in a liquid state or can be liquefied either by heat or by a suitable solvent. I have also used lime-water for the purpose. If the water from the outside rises above the level of the floor A, the bitumen or equivalent material previously injected beneath the floor and behind the walls is forced into all the crevices which may exist in the floor or walls, (as far as the latter are beneath the water-line,) and the entrance of water to the interior of the structure is effectually prevented.

In applying my invention to a subterranean tunnel, the space above the arch as well as the spaces outside of the walls and beneath the floor are filled with bitumen or equivalent material.

In introducing the bitumen or equivalent material beneath the floor and behind the walls sufficient pressure may be applied to force the bitumen or equivalent material into the crevices and cracks of the floor and walls from the outside, so that it is not necessary to depend upon the pressure of the water for this purpose.

What I claim as new, and desire to secure by Letters Patent, is—

The process of waterproofing cellars and other subterranean structures, which consists in providing such structures with a suitable floor and walls, and then charging the spaces beneath the floor and outside of the walls with bitumen or equivalent material for filling the crevices and cracks existing in said floor and walls from the outside, substantially as set forth.

In testimony whereof I have hereunto set my hand and seal in the presence of two subscribing witnesses.

JOHN J. SCHILLINGER. [L. S.]

Witnesses:
W. HAUFF,
E. F. KASTENHUBER.